US012109772B2

(12) United States Patent
Dettorre et al.

(10) Patent No.: US 12,109,772 B2
(45) Date of Patent: Oct. 8, 2024

(54) METHOD AND FACILITY FOR TRANSFERRING REELS

(71) Applicant: COMPAGNIE GENERALE DES ETABLISSEMENTS MICHELIN, Clermont-Ferrand (FR)

(72) Inventors: Jean-Marie Dettorre, Clermont-Ferrand (FR); Herve Queraud, Clermont-Ferrand (FR); Stephane Ravat, Clermont-Ferrand (FR); Nicolas Jaunet, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 734 days.

(21) Appl. No.: 17/294,191

(22) PCT Filed: Nov. 13, 2019

(86) PCT No.: PCT/FR2019/052694
§ 371 (c)(1),
(2) Date: May 14, 2021

(87) PCT Pub. No.: WO2020/099781
PCT Pub. Date: May 22, 2020

(65) Prior Publication Data
US 2022/0009185 A1 Jan. 13, 2022

(30) Foreign Application Priority Data
Nov. 15, 2018 (FR) ...................................... 1860541

(51) Int. Cl.
*B29D 30/00* (2006.01)
*B65H 19/12* (2006.01)
*G05D 1/00* (2006.01)

(52) U.S. Cl.
CPC ......... *B29D 30/0016* (2013.01); *B65H 19/12* (2013.01); *G05D 1/0225* (2013.01);
(Continued)

(58) Field of Classification Search
CPC .............................................. B29D 2030/0022
See application file for complete search history.

(56) References Cited

U.S. PATENT DOCUMENTS 4,077,580 A * 3/1978 Lang .................. B65H 19/1868
242/554.6
5,085,377 A 2/1992 Rohrer et al.
(Continued)

FOREIGN PATENT DOCUMENTS

| CN | 104870177 A | 8/2015 |
| JP | 2000-25124 A | 1/2000 |
| WO | 2008/151875 A1 | 12/2008 |

OTHER PUBLICATIONS

JP 2000-025124 A (Imaizumi) Jan. 25, 2000 (English language machine translation). [online] [retrieved Feb. 14, 2024]. Retrieved from: espacenet. (Year: 2000).*
(Continued)

*Primary Examiner* — Jonathan Snelting
(74) *Attorney, Agent, or Firm* — VENABLE LLP

(57) ABSTRACT

A method for transferring unwinders (36) using a transfer facility (38) comprising a control unit (39) for controlling the unwinders, and at least one autonomous mobile platform (40) is disclosed. The facility comprises measurement means for measuring the quantity of product wound on reels (22) supported by the unwinders and communication means. The method comprises the following successive operations: measuring the quantity of product wound on the reels and communicating the measured data to the control unit; on the basis of the measured data, determining the moment at which to transmit a removal or supply mission instruction to
(Continued)

a mobile platform; transmitting to a mobile platform at the previously-determined moment, a mission instruction to remove or to supply a unwinder; and moving the mobile platform in such a way that it becomes positioned under a unwinder.

9 Claims, 3 Drawing Sheets

(52) U.S. Cl.
CPC ............... *B29D 2030/0022* (2013.01); *B65H 2301/4175* (2013.01); *B65H 2405/422* (2013.01); *B65H 2801/93* (2013.01)

(56) References Cited

U.S. PATENT DOCUMENTS

| | | | |
|---|---|---|---|
| 6,138,938 | A | 10/2000 | Lehrieder et al. |
| 6,155,516 | A | 12/2000 | Lehrieder et al. |
| 7,485,201 | B2 | 2/2009 | De Paoli et al. |
| 7,543,775 | B2 | 6/2009 | Benvenuti et al. |
| 10,059,069 | B2 * | 8/2018 | Marchini ............... B29D 30/30 |
| 2007/0068617 | A1 | 3/2007 | De Paoli et al. |
| 2007/0108336 | A1 | 5/2007 | Benvenuti et al. |
| 2014/0057769 | A1 * | 2/2014 | Steinemann ....... B65H 23/1882 |
| | | | 493/381 |
| 2015/0343730 | A1 | 12/2015 | Marchini et al. |
| 2017/0157873 | A1 | 6/2017 | Hinc et al. |
| 2017/0233206 | A1 | 8/2017 | Wimmer et al. |
| 2017/0247214 | A1 | 8/2017 | Wimmer et al. |
| 2017/0326826 | A1 | 11/2017 | Hinc et al. |
| 2018/0141772 | A1 | 5/2018 | Prankl et al. |
| 2018/0345612 | A1 | 12/2018 | Marcet et al. |
| 2022/0001634 | A1 | 1/2022 | Dettorre et al. |

OTHER PUBLICATIONS

International Search Report dated Mar. 20, 2020, in corresponding PCT/FR2019/052694 (4 pages).

* cited by examiner

METHOD AND FACILITY FOR TRANSFERRING REELS

BACKGROUND

The present invention relates to the field of the manufacture of green tyres, and more particularly to a method and to a facility for transferring unwinders for supplying green tyre manufacturing machines with elastomeric products.

The elastomeric products used in the manufacture of green tyres generally come in the form of continuous plies or strips, possibly reinforced, and are laid on a non-stick backing also referred to as an interleaf. Each assembly made up of an interleaf and of a product is wound on a reel while the product is being stored and transported.

A green tyre manufacturing machine generally comprises a drum, laying stations and supply stations. The elastomeric products are laid circumferentially on the drum using the laying station so as to form a green tyre. Each laying station draws an elastomeric product from a supply station. The supply station unwinds the assembly made up of the interleaf and of the product from the reel, and removes the interleaf, thus supplying the green tyre manufacturing machine with product.

The reel is generally transferred from a storage facility to a supply station of the green tyre manufacturing machine by an operator who rolls the reel along on the edges of its two lateral flanges, or by a mobile unwinder on which the reel has already been loaded, the unwinder being pushed along by an operator. However, the transfer operations are tasks that are somewhat unergonomic, repetitive, and offer no added value.

It is commonplace to automate such transfer operations using autonomous mobile platforms, also referred to as self-guided vehicles. Such a platform is able to position itself underneath a container such as the unwinder on which a reel may have been loaded, to lift same and move it to the desired destination without the intervention of an operator.

The autonomous mobile platforms receive mission instructions from a control unit. When a reel situated in a supply station needs to be changed, the control unit that manages the operation of the green tyre manufacturing machines decides to transmit a removal mission instruction and/or a supply mission instruction to one or more available mobile platforms. A removal mission has the aim of positioning a mobile platform under a mobile unwinder that is supplying a green tyre manufacturing machine, of lifting it up and of moving it to a loading area. The supply mission instruction has the aim of positioning a mobile platform under a unwinder that is situated on the loading area, of lifting it up and of moving it into the supply station of a green tyre manufacturing machine.

Nevertheless, the operation of such a transfer facility has the disadvantage of being somewhat inefficient, for example when the number of mission instructions that can be transmitted simultaneously by the control unit exceeds the number of mobile platforms available. Such dysfunctionality can thus cause stoppages in a green tyre manufacturing machine, through lack of available product. It may then prove necessary to implement solutions that increase the cost and bulk of the transfer facility or of the green tyre manufacturing machine, such as, for example, to increase the number of mobile platforms or to install a buffer storage capacity between the supply stations and the laying stations.

SUMMARY

It is an objective of the invention to overcome the disadvantages of the prior art and to provide an original solution that improves the ergonomics and the flexibility of a facility for transferring unwinders. It is another objective of the invention to propose a transfer facility with optimized operation so as to reduce its cost and bulk while at the same time avoiding stoppages of a green tyre manufacturing machine.

This objective is achieved by the invention which proposes a method for transferring unwinders for supplying elastomeric products to green tyre manufacturing machines using a transfer facility, each product being wound on a reel, the said facility comprising a control unit, unwinders, and at least one autonomous mobile platform able to support and to move a unwinder, each unwinder being able to support a reel and to collaborate with the green tyre manufacturing machine in such a way as to unwind the product wound on said reel and supply said machine with product, the method being characterized in that said facility comprises evaluation means for evaluating the state of the unwinders, said evaluation means comprising measurement means for measuring the quantity of product wound on reels supported by the said unwinders, and communication means able to transmit the data measured by said measurement means to the control unit, the method comprising the following successive operations:

measuring the quantity of product wound on the reels supported by the said unwinders supplying the green tyre manufacturing machines, using the measurement means, and communicating the measured data to the control unit using the communication means, on the basis of the measured data, determining, using the control unit, the moment at which to transmit a removal or supply mission instruction to a mobile platform so that the mobile platform becomes positioned underneath the unwinder that is intended to be removed from a green tyre manufacturing machine before or at the moment at which the unwinder is to be removed, and/or in such a way that the unwinder intended to supply a green tyre manufacturing machine becomes positioned in the immediate vicinity of the said green tyre manufacturing machine by means of a mobile platform before or at the moment at which the unwinder is to be transferred into the green tyre manufacturing machine, transmitting to a mobile platform at the previously-determined moment, a mission instruction to remove or to supply a unwinder, moving the mobile platform in such a way that it becomes positioned underneath the unwinder that is intended to be removed from a green tyre manufacturing machine, or moving the mobile platform supporting the unwinder intended to supply a green tyre manufacturing machine so that it becomes positioned in the immediate vicinity of the green tyre manufacturing machine.

The method according to the invention for transferring unwinders uses means that are partially or fully automated, thereby making it possible to avoid the intervention of an operator. An autonomous mobile platform is a compact, flexible and manoeuvrable means able to move a unwinder around, and facilitating the installation of the transfer facility. The use of an autonomous mobile platform allows gains in the productivity of the transfer facility, because the autonomous mobile platform is able to string the missions together without waiting, as long as its batteries are sufficiently charged. The measurement means make it possible to anticipate the moment at which the reel will need to be removed from the supply station and thus to optimize the use of the mobile platform or platforms so as to minimize the cost of the transfer facility, and manage the number of green tyres on which said product can be laid. The measurement means also make it possible to minimize product offcuts by joining together unused products of the same reference to form a product capable of being laid on at least one green tyre.

Advantageously, the measurement means for measuring the quantity of product are arranged on the green tyre manufacturing machines and said communication means are coincident with the communication means of said manufacturing machines.

The measurement means can readily be installed on the green tyre manufacturing machines which have available the power sources needed to power the measurement means. The measurement means benefit from the availability of the communication means of the manufacturing machine with which they can relay the measured data to the control unit.

As a preference, each unwinder comprises unwinder identification means, preferably a chip of the RFID type, and unwinder location means, preferably a Bluetooth beacon.

Precise knowledge of the identity and of the location and movements of the unwinders enables optimization of the number of unwinders, the location of the unwinder storage sites and, when a wound product is supported by the unwinder, of other information concerning the state of the reel, such as the ageing deadline for said product. A chip of the RFID type is a simple and passive means for storing data and particularly identification data. An RFID beacon is a simple, compact and power-sparing way of locating a unwinder.

Advantageously, the green tyre manufacturing machine comprises at least one housing in which a unwinder is able to be housed by a mobile platform, and two distinct ways of accessing the said housing, which can be used by a mobile platform supporting a unwinder, the method comprising the following successive operations:

moving a first mobile platform supporting the first unwinder as far as a position adjacent to the first access, moving a second platform supporting a second unwinder through the second access so as to remove the second unwinder from the housing, moving the first mobile platform through the first access and housing the first unwinder in the housing.

In this way, the time taken to replace a reel is optimized.

As a preference, each mobile platform comprises at least a radar, the method comprising, during the operations of moving the mobile platform, the following successive operations:

scanning the environment of the green tyre manufacturing machine using the radar, identifying the green tyre manufacturing machine, circumnavigating the identified obstacles when moving the mobile platform.

Advantageously, the control unit of the transfer facility communicates with an automated controller of a green tyre manufacturing workshop in which the green tyre manufacturing machine that is to be supplied with elastomeric products is situated.

As a preference, the method comprises the following operation:

after having received information that a mobile platform has accomplished its mission to supply or to remove, transmitting to the mobile platform, using the control unit, an instruction to begin a new supply or removal mission.

Advantageously, each mobile platform is mounted on driven wheels and comprises motors that drive the wheels and batteries supplying electrical power, the method comprising the following operation:

after the mobile platform has verified its battery level, beginning a new supply or removal mission.

As a preference, the transfer facility comprises a docking station able to charge the batteries of a mobile platform, the method comprising the following operation: as soon as its battery level drops below a predetermined limit, moving a mobile platform to the docking station and charging the mobile platform.

Another subject of the invention is a facility for transferring unwinders for supplying elastomeric products to green tyre manufacturing machines, each product being wound on a reel, the said facility comprising a control unit, unwinders, and at least one autonomous mobile platform able to support and to move a unwinder, each unwinder being able to support a reel and to collaborate with the green tyre manufacturing machine in such a way as to unwind the product wound on said reel and supply said machine with product, the facility being characterized in that said facility comprises evaluation means for evaluating the state of the unwinders, said evaluation means comprising measurement means for measuring the quantity of product wound on reels supported by the said unwinders, and communication means able to transmit the data measured by said measurement means to the control unit.

BRIEF DESCRIPTION OF THE DRAWINGS

The invention will be better understood from the remainder of the description, which is based on the following figures.

DETAILED DESCRIPTION

In the various figures, elements that are identical or similar bear the same reference. Their description is therefore not systematically repeated.

Figure 1:
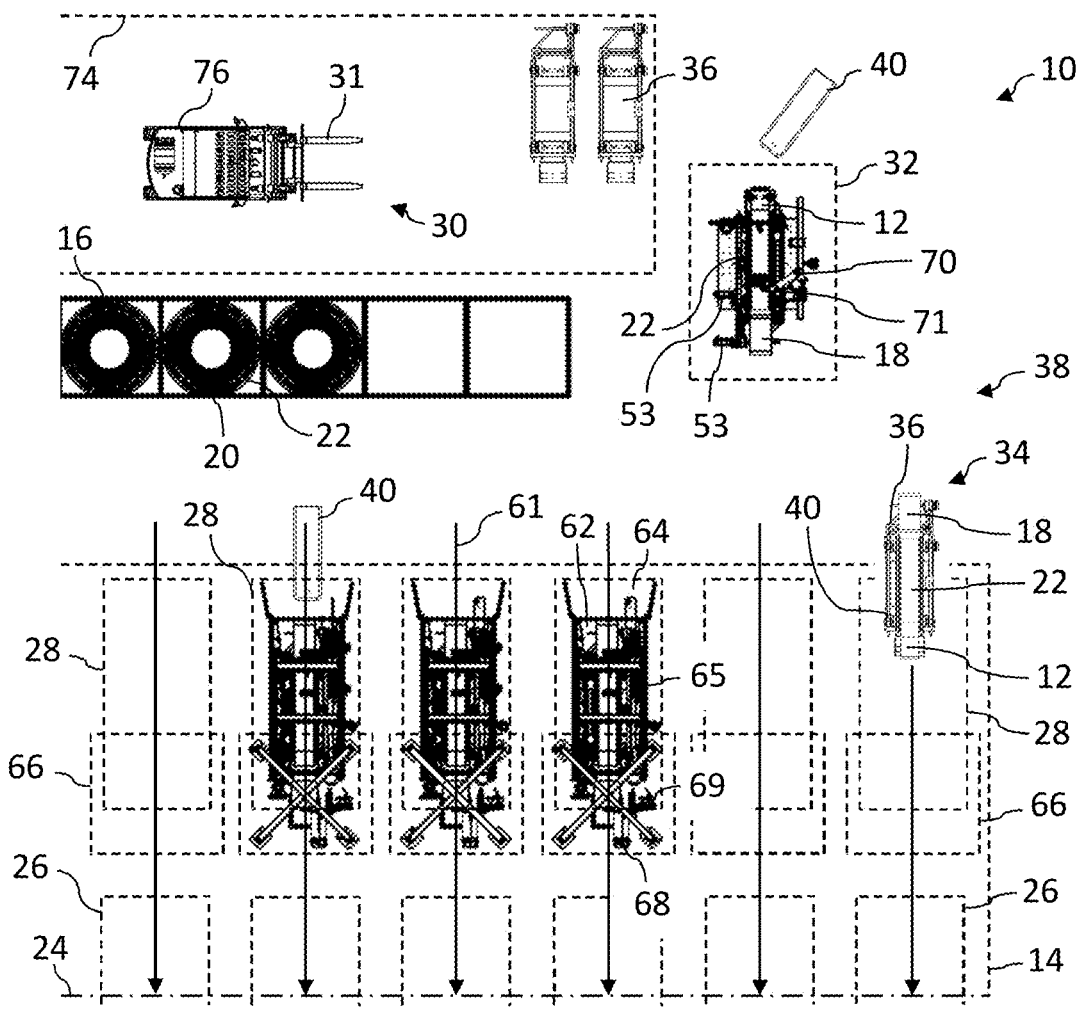
FIG. 1 is a view from above of a facility for supplying green tyre manufacturing machines with elastomeric products.

As illustrated in FIG. 1, the invention relates to a facility 10 for supplying green tyre manufacturing machines 14 with elastomeric products 12. The supply facility is situated downstream, in the direction of travel of the elastomeric products, of a store 16 of elastomer products and upstream of green tyre manufacturing machines.

What is meant by an elastomeric product 12 is a product containing an elastomer matrix, possibly reinforced with textile or metal filamentary elements. The product 12 is continuous and takes the form of a ply, or else of one or more strips laid parallel to one another. The product is arranged longitudinally on a non-stick backing 18, also referred to as an interleaf, allowing the product to be stored and transported in the form of a wound roll 20. The assembly formed by the product and the non-stick backing is wound onto the core of a reel 22. In the storage space 16, the reel is arranged in a laying-down position. In other words, the reel lays flat on one of its lateral flanges, and the wound roll 20 forms a cylinder of revolution of vertical axis. Having the reel in a laying-down position, allows the product 12 to better hold its shape.

A green tyre manufacturing machine 14 generally comprises a drum (not depicted) in the form of a cylinder of revolution having an axis of revolution 24 around which the drum is able to rotate and along which the drum is capable of translational movement. The manufacturing machine also comprises at least one laying station 26 and at least one supply station 28 respectively laying and supplying elastomer products 12. The elastomeric products are laid circumferentially on the drum using the laying station so as to form a green tyre. As it is laid, each elastomeric product is drawn from the supply station. By way of example, a green tyre manufacturing machine particularly suitable for implementation of the supply facility 10 comprises a plurality of supply stations, arranged parallel to one another, perpendicular to the axis of revolution 24 of one or more drums.

The supply facility 10 notably comprises a loading member 30, a preparation station 32 and at least one transfer member 34 comprising a unwinder 36. The transfer member also forms part of a transfer facility 38 and is able to transfer a reel 22 from the preparation station to a supply station 28 supplying the green tyre manufacturing machine 14. By way of example, a supply facility comprises three transfer members for eight supply stations, and twenty-four unwinders. The loading member 30 is able to load a reel 22 onto a unwinder. The preparation station is notably able to wind or unwind the assembly formed by the product 12 and the non-stick backing 18.

Figure 4:
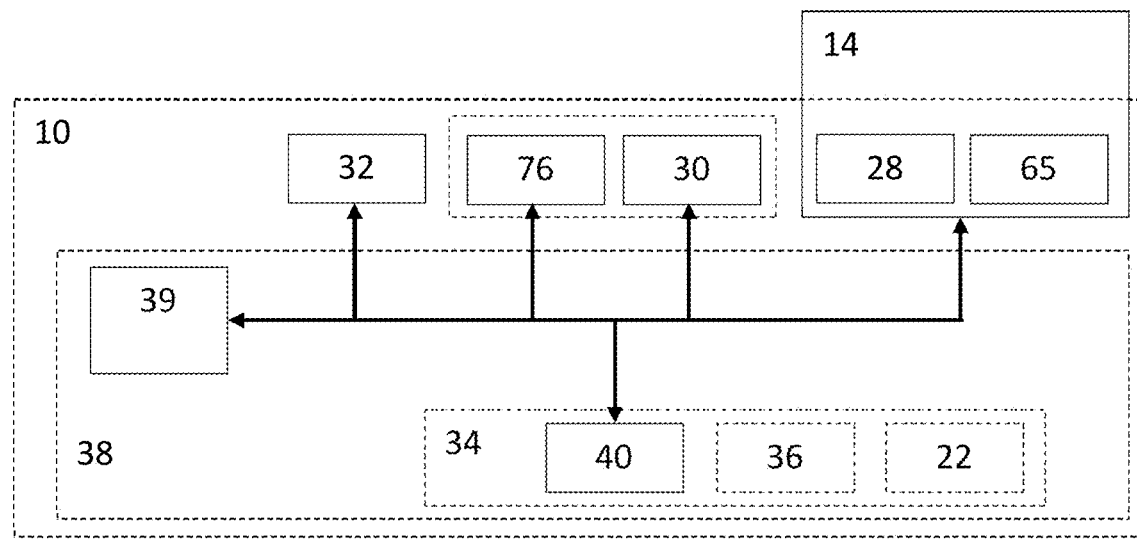
FIG. 4 is a block diagram illustrating the flow of communications between certain elements of the supply facility of FIG. 1.

The supply facility 10 and the transfer facility 38 comprise a control unit 39 (FIG. 4) belonging to an automated controller of a workshop in which a facility for supplying elastomer products 12 and green tyre manufacturing machines 14 are situated. The transfer facility further comprises unwinders 36 and at least one mobile platform 40 able to support and to move a unwinder. The assembly formed by mobile platform and a unwinder is also known as transfer member 34 of a reel 22.

Figure 2:
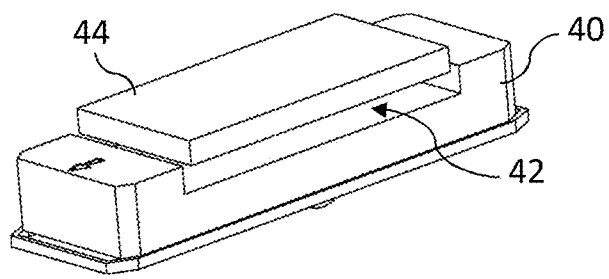
FIG. 2 is a perspective view illustrating a mobile platform of the supply facility of FIG. 1.

The mobile platform 40 illustrated in FIG. 2 is autonomous and is able to undertake missions of removing a unwinder 36 from or missions of supplying a unwinder to the green tyre manufacturing machine 14. The control unit 39 programs and transmits the mission instructions to the mobile platforms. What is meant by autonomous is that the mobile platform is capable of moving without human intervention. The mobile platform comprises guidance means and means of communication with the control unit 39, for example using Wi-Fi. By way of example, the guidance of an autonomous mobile platform may be of the wire-guided, laser-guided, optically guided or else geoguided type. As a preference, the guidance of an autonomous mobile platform is of the laser-guided type and uses algorithms of the SLAM type, allowing the platform to adapt to its environment. The autonomous mobile platforms 40 are flexible in use and do not require the creation of infrastructures or works. Thus it becomes easier to integrate the transfer facility 38 between the storage space 16 and the green tyre manufacturing machines 14.

The guidance means that guide the mobile platform 40 comprise sensors such as a radar to scan and identify the environment of the mobile platform and/or inertial unit, or else magnetic references that allow the mobile platform to identify its location within its environment. The guidance means further comprise a microprocessor controller to calculate the path of the platform as a function of the target destination in a mission instruction transmitted to the mobile platform by the control unit 39, and of the data gathered by the sensors. The mobile platform also identifies any obstacles or individuals that might be present in its environment and may decide to calculate the most effective path for circumnavigating these and reaching its destination.

The platform 40 comprises a lifting device 42 which collaborates with a container such as a unwinder 36. The container, of generally rectangular shape, is supported by four points of contact and is designed so that when the container is resting on the ground on its points of contact and the lifting device is inactive, the platform can be positioned underneath the container. When the platform is positioned underneath a container and the lifting device is active, the container is raised by the lifting device so that its four points of contact no longer rest on the ground. The mobile platform is thus able to move the container. The lifting device comprises a plate 44 that forms part of the upper surface of the platform, and an actuator (not depicted), such as a ram or a pantograph moved by a screw-nut system.

The mobile platform 40 comprises a chassis of generally rectangular shape. The chassis is supported by at least three wheels. By way of example, the chassis may have four or six wheels of which at least one wheel is driven. As a preference, each wheel can be oriented by an angle extending up to 90° so as to allow the mobile platform to dock with its destination, for example the supply station 28, sideways. Thus, the platform is highly manoeuvrable in a tight space. Each driven wheel is driven by an electric motor which is powered by electrical power supply batteries installed on the chassis of the mobile platform.

The transfer facility comprises a docking station (not illustrated) able to charge the batteries of a mobile platform 40. When the mobile platform is not on a removal or supply mission, the mobile platform moves to the station at which it connects itself to an electric charging terminal.

Figure 3:
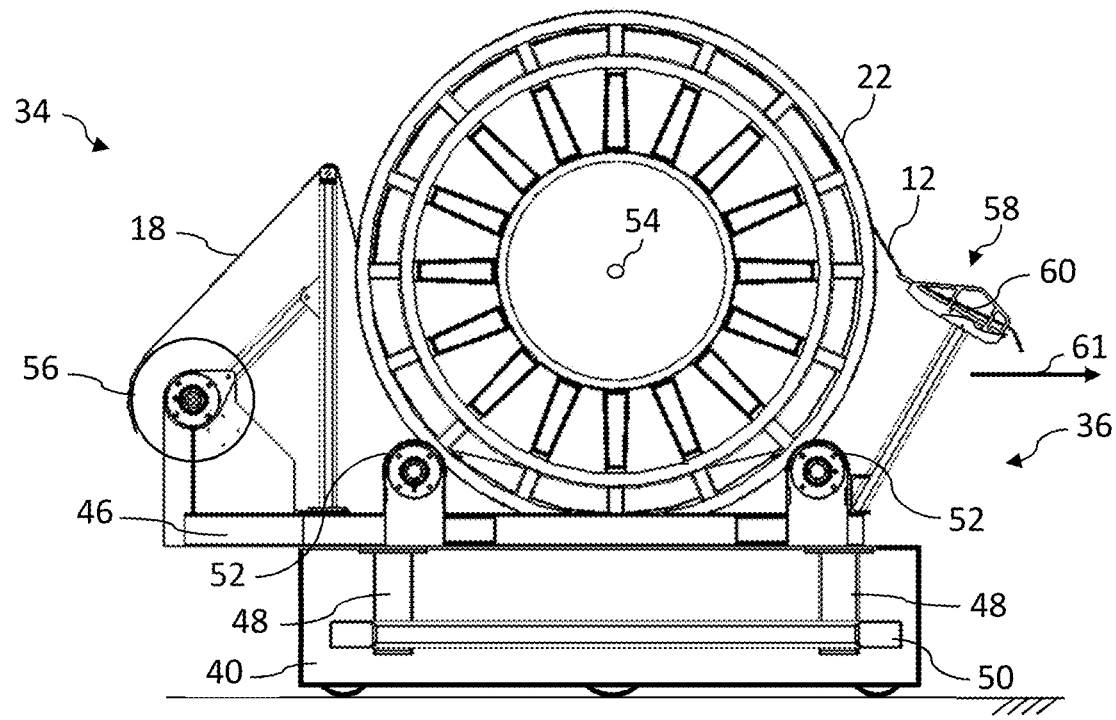
FIG. 3 is a side view illustrating certain elements of the supply facility of FIG. 1.

A unwinder 36 as illustrated in FIG. 3 comprises a chassis 46 of generally rectangular shape. The chassis is supported by four points of contact 48 arranged one at each corner of the chassis. The points of contact of the chassis are connected by two guides 50 along two opposite sides of the chassis. One guide has the function of making it easier for the mobile platform 40 to move between the points of contact of the unwinder. A unwinder further comprises two parallel rollers 52, each roller being mounted with the ability to rotate with respect to the chassis 46. The rollers have the function of supporting a reel 22, and of allowing the elastomeric product 12 contained on the reel to be unwound or wound on. The rollers are made to rotate by at least one motor 53 incorporated into the chassis of the unwinder or, as a preference, incorporated into the supply stations 28 and preparation stations 32, in which case the motor comprises means of coupling to the rollers. The motor 53 drives a belt of the unwinder, which belt is connected to the rollers thus allowing them to be turned. A reel is placed in an upright position on the unwinder. In other words, the reel rests on the rollers via the edge of its lateral flanges, and the reel thus positioned is able to rotate about a horizontal axis 54.

A unwinder also comprises a bobbin 56 and a dispenser 58. What is meant by a bobbin is a reel that is small in size in comparison with the dimensions of the reel 22 containing the elastomeric product 12. The purpose of the bobbin is to receive, around its core, the non-stick backing 18 after this has been detached from the elastomeric product. The bobbin 56 is mounted with the ability to rotate with respect to the chassis 46 parallel to the axis of rotation 54 of the reel, on the rear face of the unwinder or, in other words, on the opposite side to the side from which the product is drawn. The bobbin is rotationally driven by means of a motor 53 so as to wind up or unwind the non-stick backing. By way of example, the motor is incorporated into the chassis 46 of the unwinder or, as a preference, incorporated into the supply station and preparation station, in which case the motor 53 comprises means of coupling to the rollers. The purpose of the dispenser 58 is to support the product to facilitate subsequent handling thereof. The dispenser comprises a tray 60 arranged on the front face of the dispenser or, in other words, in the direction 61 in which the product is drawn.

A supply station 28 comprises a housing 62 and at least one access 64 to the housing from outside the green tyre manufacturing machine 14. The access can be used by a mobile platform 40 loaded with a unwinder 36 or by a mobile platform on its own. This housing is able to house and precisely position a mobile platform loaded with a unwinder. As a preference, the supply station comprises two accesses, for example a first access on the rear face of the supply station 28 in the opposite direction to the direction in which the product is drawn, and a second access (not depicted) on a lateral face of the supply station. Thus, as soon as a first mobile platform 40 has removed a unwinder from the housing 62 using the first access, a second mobile platform need not wait until the first mobile platform has vacated the first access to the housing. The second mobile platform can immediately access the vacated housing and thus reduce the time needed for changing over a reel. The housing of the supply station is formed by a meshwork enclosure and access to the housing is formed by an opening in the enclosure. As a preference, the transfer facility comprises positioning studs arranged on the ground and allowing the mobile platform to position itself quickly and compensate for the lack of positional precision of a mobile platform.

A transfer facility 38 comprises means for evaluating the state of a reel 22. By way of example, the means for evaluating the state of a reel may be arranged on the unwinder 36, at the preparation station 32 or at the supply station 28. What is meant by the state of a reel is, for example, the identity and/or the location of the reel, the reference, the quantity, and the ageing deadline for the product contained on the reel, or else the temperature and humidity of the air in the environment surrounding the reel. The means for evaluating the state of a reel allow optimization of the quality of the products 12 supplied to a green tyre manufacturing machine 14, the operation and means necessary for the operation of the transfer facility 38.

The means for evaluating the state of a reel 22 notably comprise measurement means 65 for measuring the quantity of product 12 contained on the reel. As a preference, the measurement means for measuring the quantity of product are arranged on the green tyre manufacturing machines 14 and said communication means are coincident with the communication means of said manufacturing machine. Measuring the quantity of product wound on reels supported by unwinders 36 supplying the manufacturing machines 14 allows the mission instructions transmitted to the mobile platforms 40 for changing a reel to be anticipated, thus making it possible to minimize the usage and number of the mobile platforms.

The control unit 39 determines the moment at which to transmit a removal or supply mission instruction to a mobile platform 40 so that the mobile platform becomes positioned underneath the unwinder 36 that is intended to be removed from a green tyre manufacturing machine 14 before or at the moment at which the unwinder is to be removed, and/or in such a way that the unwinder intended to supply a green tyre manufacturing machine becomes positioned in the immediate vicinity of the said green tyre manufacturing machine by means of a mobile platform before or at the moment at which the unwinder is to be transferred into the green tyre manufacturing machine.

By way of example, the measurement means take the form of a telemeter able to measure the distance separating it from the wound roll, so as to thus determine the diameter of the wound roll 20. Knowing the diameter of the wound roll provides an approximation of the length of product contained on the reel at more less the perimeter of the roll at a given moment. The telemeter is preferably associated with a rotary encoder able to determine the angular position of the reel on the unwinder. Combining the measurements from the telemeter and from the encoder provides a more refined estimate of the length of product contained on the reel. The telemeter and the encoder are arranged at the preparation station 28 and connected to the controller of the manufacturing machine 14.

The unwinder 36 also comprises unwinder location means, such as a sensor of GPS type, or, for preference, a Bluetooth beacon. A Bluetooth beacon transmits its identifier to a receiver that forms part of the transfer facility 38, and communicates with the control unit 39. The control unit is thus able to itemize the movements of the unwinders so as to determine and program optimized mission instructions. Knowing the movements of the unwinders also makes it possible to optimize the positioning of the various elements of a facility 10 for supplying elastomer products 12 and/or for transferring a unwinder.

The green tyre manufacturing machine 14 further comprises a joining station 66 situated downstream of the supply station 28 and upstream of the laying station 26. The purpose of the joining station is to automatically join the end of the product 12 unwound from a reel 22 at the supply station to the residual end of a previous product supplying the green tyre manufacturing machine. To this end, the joining station comprises a collaborative manipulator arm 68. What is meant by manipulator arm is an automated manipulator arm of the six-axis anthropomorphic type, formed of a series of portions articulated to one another. What is meant by a collaborative manipulator arm is a manipulator arm able to collaborate with an operator without a safety enclosure. The collaborative manipulator arm comprises force or proximity sensors acting on said arm and detecting the approach of an operator or of an object. In addition, the collaborative manipulator arm is limited in speed and in force so as to reduce the severity of a collision with an operator. The segment at the free end of the manipulator arm comprises an effector 69, for example a gripper, able to cut the elastomeric product 12 in such a way that the ends that are to be butt-jointed together have uniform cross sections, and able to arrange and then compress said ends on one another in order to join them.

Figure 5:
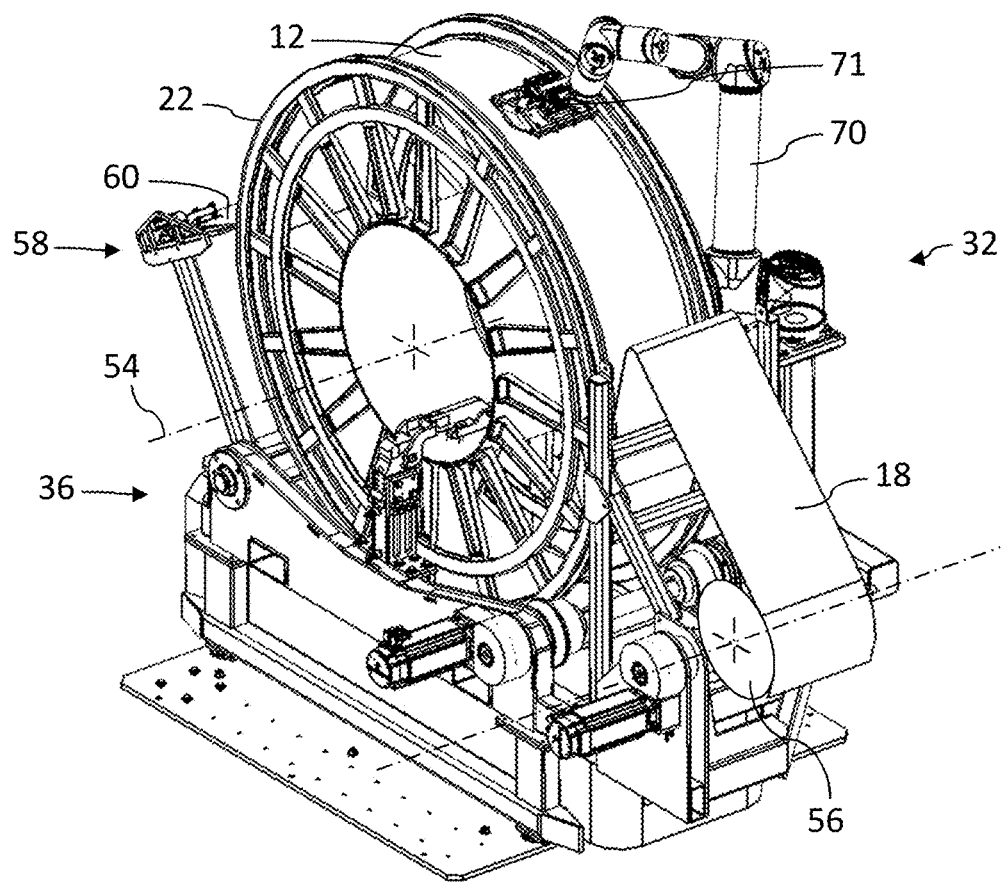
FIG. 5 is a perspective view notably illustrating a preparation station of the supply facility of FIG. 1.

As illustrated in FIGS. 1 and 5, the preparation station 32 is situated upstream of the storage space 16 and downstream of the green tyre manufacturing machines 14, in the direction of circulation of the elastomeric products 12. The preparation station comprises a collaborative manipulator arm 70. The segment at the free end of the manipulator arm comprises an effector 71, for example a gripper, able to arrange the end of the product and the end of the non-stick backing 18 in such a way that the end of the product is laid on the dispenser 58 of the unwinder 36 and the end of the non-stick backing is wound onto a bobbin 56 of the unwinder.

The loading member 30 is situated on a loading area 74 and is able to load a reel 22 onto a unwinder 36. By way of example, the loading member takes the form of a manipulator arm equipped with a gripper able to manipulate a reel or, as a preference, with rotary forks 31 arranged on a handling apparatus 76. The handling apparatus is preferably of the autonomous forklift truck type. The rotary forks arranged on the autonomous forklift truck are able to pick up a reel from the storage area 16, pivoting it from a laying-down position to an upright position and setting it down on the rollers 52 of a unwinder. The autonomous forklift truck is able to transfer a reel automatically between the storage area and a unwinder without the intervention of an operator. The handling apparatus comprises means of communication with the control unit 39 so as to receive instructions of missions for transferring and handling a reel, and so as to transmit state data, such as the position of the handling apparatus or the state of progress with the missions of transferring and handling a reel.

Figure 6:
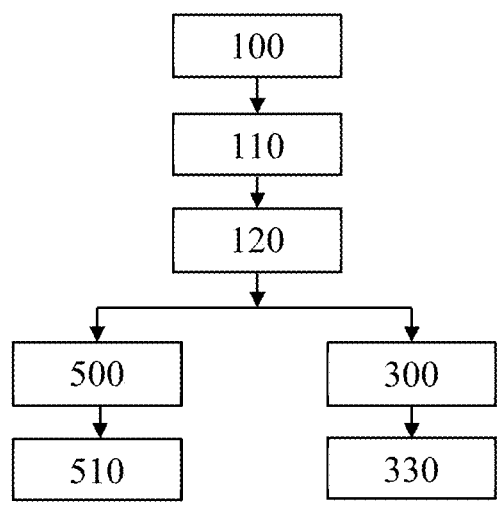
FIG. 6 is a block diagram illustrating operations of a method for transferring a unwinder.
Figure 7:
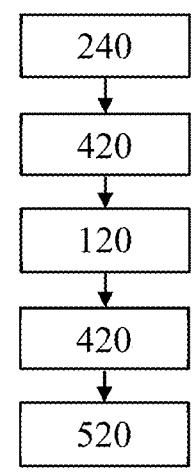
FIG. 7 is a block diagram illustrating operations of a method for supplying elastomeric product.

FIGS. 6 and 7 illustrate a method for supplying green tyre manufacturing machines 14 with elastomeric products 12, and a method for transferring unwinders 13 for supplying green tyre manufacturing machines with elastomeric products.

The quantity of product wound on reels 22 supported by unwinders 36 supplying the green tyre manufacturing machines 14 is measured 100 using the evaluation means of each unwinder and the measured data are communicated 110 to the control unit 39 using the communication means of the manufacturing machine 14.

On the basis of the measured data, the control unit 39 is used to determine 120 the moment at which to transmit a removal or supply mission instruction to a mobile platform so that the mobile platform becomes positioned underneath the unwinder that is intended to be removed from a green tyre manufacturing machine before or at the moment at which the unwinder is to be removed, and/or in such a way that the unwinder intended to supply a green tyre manufacturing machine becomes positioned in the immediate vicinity of the said green tyre manufacturing machine by means of a mobile platform before or at the moment at which the unwinder is to be transferred into the green tyre manufacturing machine.

A mission instruction is transmitted 200 to an autonomous handling apparatus 76 using a control unit 39. A reel 22 is picked up 210 from the storage area 16 using the loading member 30. The reel is pivoted 220 from a laying-down position into an upright position using the rotary forks of the loading member 30. The reel 22 is transferred 230 from the storage area 16 as far as a unwinder 36 using the handling apparatus 76 on which the rotary forks are arranged. The reel is set down 240 onto the rollers 52 of the unwinder using the loading member 30. The data regarding the state of progress of the mission are transmitted 250 to the control unit 39 using the communication means of the handling apparatus 76.

A mission instruction is transmitted 300 to an available mobile platform 40 using the control unit 39. The mobile platform is moved 310 as far as the unwinder 36 onto which a reel 22 has been loaded, and the unwinder is lifted 320 using a lifting device 42 of the mobile platform. The mobile platform is then moved 330 as far as a preparation station 32.

There is coupling 400 to the rollers 52 of the unwinder 36 then they are rotationally driven 410 using a motor belonging to the preparation station 32, thereby at the same time driving the rotation of the reel 22. The assembly formed by the product 12 and the non-stick backing is unwound and/or positioned 420 in such a way that the manipulator arm 70 of the preparation station is capable of taking hold of the end of the product and/or of the end of the non-stick backing. The end of the non-stick backing is arranged 430, using the manipulator arm, in such a way that it is placed on a bobbin 56 of the unwinder, and the end of the product is arranged 440 in such a way that it is placed on the tray 60 of a dispenser 58.

A mission instruction to remove or to supply a unwinder 36 is transmitted 500 to a mobile platform 40 using the control unit 39. The mobile platform is moved 510 in such a way that it becomes positioned underneath the unwinder 36 that is intended to be removed from a green tyre manufacturing machine, or the mobile platform supporting the unwinder intended to supply a green tyre manufacturing machine is moved 520 so that it becomes positioned in the immediate vicinity of the supply station 28 of the green tyre manufacturing machine 14.

A first mobile platform 40 supporting a first unwinder 36 intended to supply a green tyre manufacturing machine 14 is moved 600 into a position adjacent to a first access 54 belonging to a green tyre manufacturing machine 14. A second platform supporting a second unwinder is moved 610 through a second access belonging to a green tyre manufacturing machine 14 so as to remove the second unwinder from the housing. The first mobile platform is moved 620 through the first access and the first unwinder is housed 630 in the housing.

A motor of the supply station 28 is coupled 700 to the rollers 52 of the unwinder 36 supporting the reel 22 intended to supply a green tyre manufacturing machine 14, and the reel is made to rotate. The end of the product is automatically joined 710 to a residual end of the previous product supplying the green tyre manufacturing machine, using the manipulator arm 68 of a joining station 66.

When the reel 22 is to be removed from the supply station 28, the reel is transferred 800 from the green tyre manufacturing machine 14 to the preparation station 32 using a mobile platform 40. The end of the elastomeric product 12 that is presented on the dispenser 58 of the unwinder 36 is wound 810 onto the reel in such a way that the end of the product is laid down onto the non-stick backing 18, and/or the non-stick backing is wound 820 onto the reel in such a way that the non-stick backing is no longer wound onto the bobbin 58, using the motor of the preparation station.

As a preference, two unwinders 36 supporting reels 22 containing an elastomeric product 12 with identical references are positioned 830 facing one another via their front face. The ends of the products presented on the dispenser 58 of the unwinders are joined together 840 using the manipulator arm 70. The product from one of the unwinders is wound 850 onto the other unwinder opposite.

The reel is unloaded 900 from the unwinder using the loading member. The reel is transferred 910 automatically from the preparation station to the storage area using the handling apparatus.

The environment of the green tyre manufacturing machine is scanned using the radar of a mobile platform 40. The green tyre manufacturing machine is identified within the environment using the controller of the mobile platform. The identified obstacles are circumnavigated when the mobile platform is moved.

After having received information that a mobile platform 40 has accomplished its mission to supply or to remove, the control unit 39 is used to transmit to the mobile platform an instruction to begin a new supply or removal mission. After the mobile platform has verified its battery level, a new supply or removal mission is begun. As soon as its battery level drops below a predetermined limit, a mobile platform is moved to the docking station.

The invention claimed is:

1. A method for transferring unwinders for supplying elastomeric products to green tire manufacturing machines using a transfer facility, each elastomeric product being wound on a reel, the facility comprising a control unit, unwinders, and at least one autonomous mobile platform able to support and to move an unwinder, each unwinder being able to support a reel and to collaborate with a green tire manufacturing machine in such a way as to unwind the elastomeric product wound on the reel and supply the green tire manufacturing machine with the elastomeric product, the transfer facility comprising:

evaluation means for evaluating a state of the unwinders, the evaluation means comprising measurement means for measuring a quantity of elastomeric product wound on a reel supported by an unwinder; and communication means able to transmit data measured by the measurement means to the control unit, and the method comprising the following successive steps:

measuring a quantity of elastomeric product wound on a reel supported by an unwinder supplying the green tire manufacturing machine, using the measurement means, and communicating measured data to the control unit using the communication means;

on a basis of the measured data, determining, using the control unit, a moment at which to transmit a removal or supply mission instruction to an autonomous mobile platform so that (a) the autonomous mobile platform becomes positioned underneath the unwinder that is intended to be removed from the green tire manufacturing machine before or at a moment at which the unwinder is to be removed, (b) the unwinder intended to supply a green tire manufacturing machine becomes positioned in an immediate vicinity of the green tire manufacturing machine by means of the autonomous mobile platform before or at the moment at which the unwinder is to be transferred into the green tire manufacturing machine, or (c) both (a) and (b);

transmitting to the autonomous mobile platform at the previously-determined moment, the mission instruction to remove or to supply an unwinder; and moving the autonomous mobile platform in such a way that the autonomous mobile platform becomes positioned underneath the unwinder that is intended to be removed from the green tire manufacturing machine or moving the autonomous mobile platform supporting the unwinder intended to supply the green tire manufacturing machine so that the autonomous mobile platform becomes positioned in the immediate vicinity of the green tire manufacturing machine.

2. The method according to claim 1, wherein the measurement means are arranged on the green tire manufacturing machines and the communication means are coincident with the communication means of the green tire manufacturing machines.

3. The method according to claim 1, wherein each unwinder comprises unwinder identification means and unwinder location means.

4. The method according to claim 1, wherein each green tire manufacturing machine comprises at least one housing in which an unwinder is able to be housed by an autonomous mobile platform and two distinct ways of accessing the housing, which can be used by the autonomous mobile platform supporting an unwinder, the method further comprising the following successive steps:

moving a first autonomous mobile platform supporting a first unwinder as far as a position adjacent to a first access;

moving a second autonomous mobile platform supporting a second unwinder through a second access so as to remove the second unwinder from the housing; and moving the first autonomous mobile platform through the first access and housing the first unwinder in the housing.

5. The method according to claim 1, wherein each autonomous mobile platform comprises at least a radar, the method further comprising, during operations of moving the autonomous mobile platform, the following successive steps:

scanning an environment of the green tire manufacturing machine using the radar;

identifying the green tire manufacturing machine; and circumnavigating identified obstacles when moving the autonomous mobile platform.

6. The method according to claim 1, wherein the control unit of the transfer facility communicates with an automated controller of a green tire manufacturing workshop in which the green tire manufacturing machine that is to be supplied with elastomeric products is situated.

7. The method according to claim 1, further comprising the following step:

after having received information that an autonomous mobile platform has accomplished a mission to supply or to remove, transmitting to the autonomous mobile platform, using the control unit, an instruction to begin a new supply or removal mission.

8. The method according to claim 1, wherein each autonomous mobile platform is mounted on driven wheels and comprises motors that drive the wheels and batteries supplying electrical power, the method further comprising the following step:

after the autonomous mobile platform has verified a battery level, beginning a new supply or removal mission.

9. The method according to claim 8, wherein the transfer facility comprises a docking station able to charge the batteries of an autonomous mobile platform, the method further comprising the following step:

as soon as the battery level drops below a predetermined limit, moving the autonomous mobile platform to the docking station and charging the autonomous mobile platform.

* * * * *